（12）United States Patent
Lo et al.

(10) Patent No.: US 10,261,235 B2
(45) Date of Patent: Apr. 16, 2019

(54) DISPLAY APPARATUS AND METHOD FOR ALTERING THE DISPLAY APPARATUS

(71) Applicant: HON HAI PRECISION INDUSTRY CO., LTD., New Taipei (TW)

(72) Inventors: Wen-Chin Lo, New Taipei (TW); Chun-Yun Pan, New Taipei (TW); Sin-Tung Huang, New Taipei (TW); Chien-Yu Wei, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 22 days.

(21) Appl. No.: 15/604,781

(22) Filed: May 25, 2017

(65) Prior Publication Data

US 2017/0343719 A1 Nov. 30, 2017

(30) Foreign Application Priority Data

May 27, 2016 (TW) .................................. 105116678

(51) Int. Cl.
*F21V 8/00* (2006.01)
(52) U.S. Cl.
CPC .......... *G02B 6/005* (2013.01); *G02B 6/0055* (2013.01)
(58) Field of Classification Search
CPC .............................. G02B 6/005; G02B 6/0055
See application file for complete search history.

(56) References Cited

U.S. PATENT DOCUMENTS

| 2015/0085223 | A1* | 3/2015 | Park | G02F 1/133615 349/65 |
|---|---|---|---|---|
| 2016/0070137 | A1* | 3/2016 | You | G02F 1/133609 349/71 |
| 2016/0170114 | A1* | 6/2016 | Watano | G02B 5/3041 349/69 |
| 2017/0146859 | A1* | 5/2017 | Lin | G02F 1/13362 |
| 2017/0160431 | A1* | 6/2017 | You | G02B 6/005 |
| 2017/0219758 | A1* | 8/2017 | Jang | G02B 6/0023 |
| 2018/0204987 | A1* | 7/2018 | Li | F21V 9/40 |

* cited by examiner

*Primary Examiner* — Anh T Mai
*Assistant Examiner* — Glenn D Zimmerman
(74) *Attorney, Agent, or Firm* — ScienBiziP, P.C.

(57) ABSTRACT

A display apparatus which is not subject to light leakage from a cut edge of a quantum dot layer includes a display panel and a backlighting module. The backlight module includes light source, light guide plate, and quantum dot enhancement layer. The quantum dot enhancement layer has functional and invalidation portions. The functional portion converts light from the light guide plate into predetermined wavelengths. The invalidation portion is formed in the non-display region, and is unable to convert light from the light guide plate into predetermined wavelengths. A distance between a side surface of the invalidation portion and a side surface of the main display region is larger than or equal to a predetermined distance. The effect of the predetermined distance is to prevent the light leaking or transmitted from the invalidation portion from entering the display region at normal viewing angles.

8 Claims, 4 Drawing Sheets

DISPLAY APPARATUS AND METHOD FOR ALTERING THE DISPLAY APPARATUS

CROSS-REFERENCE TO RELATED APPLICATIONS

This application claims priority to Taiwanese Patent Application No. 105116678 filed on May 27, 2016, the contents of which are incorporated by reference herein.

FIELD

The subject matter herein generally relates to a display apparatus and a method for altering the display apparatus.

BACKGROUND

Backlighting units are widely used in all kinds of electrical apparatus, such as display apparatus. A display apparatus generally includes a display panel and a backlighting module for providing a backlight to the display panel. The backlighting module includes a light source and a plurality of optical films, such as light guide plate, a film, a reflector, a diffuser, and a quantum dot enhancement film (QDEF). The QDEF converts a wavelength of light. An invalidation portion along a cutting path may be generated when cutting the QDEF to a desired size by laser. The quantum dots in the invalidation portion are damaged and lose the ability to convert wavelength of light. Thus, a light from the light source with an original wavelength may leak from the invalidation portion causing a light leakage of the display apparatus. A light leakage of the display apparatus would be prevented by an improved structure.

BRIEF DESCRIPTION OF THE FIGURES

Implementations of the present technology will now be described, by way of example only, with reference to the attached figures.

DETAILED DESCRIPTION

Figure 1:
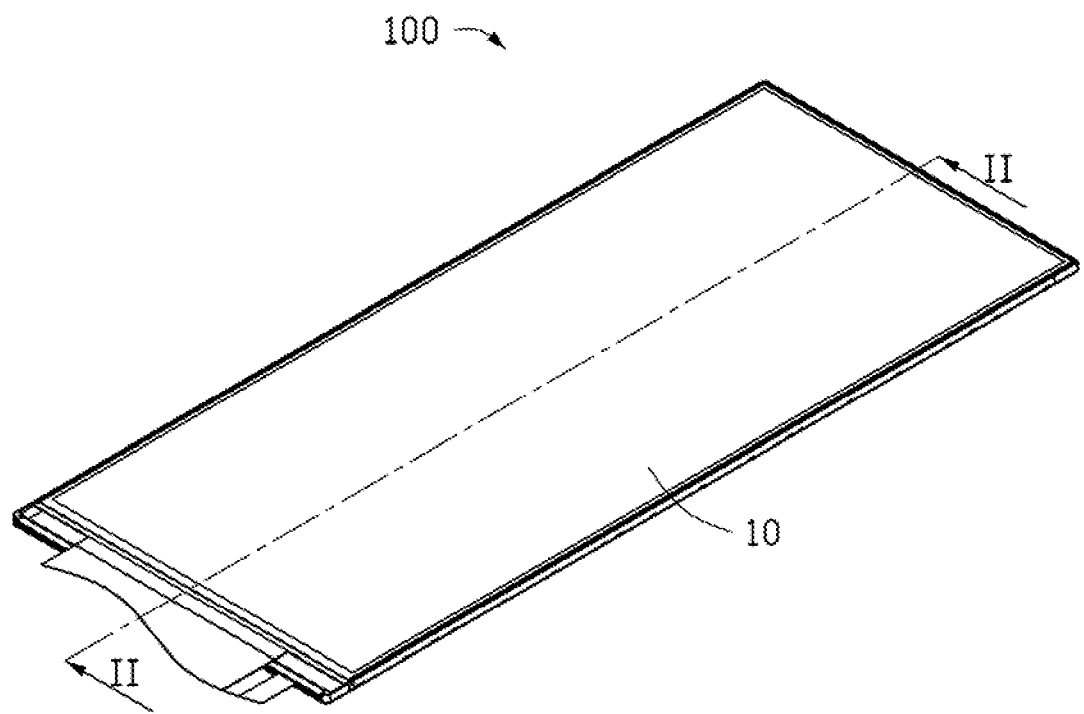
FIG. 1 is a planar view of an exemplary embodiment of a display apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

When lighting a display apparatus, the light emitted by a light source passes through a light guide plate and a quantum dot enhancement film. The quantum dot enhancement film may include an invalidation portion created during a cutting process. The invalidation portion fails to convert wavelength of light, and directly transmits the un-converted light to enter the display region, which can cause light leakage. Therefore, a present disclosure is described in relation to a display apparatus for preventing a light leakage from the invalidation portion of the quantum dot enhancement film.

Figure 2:
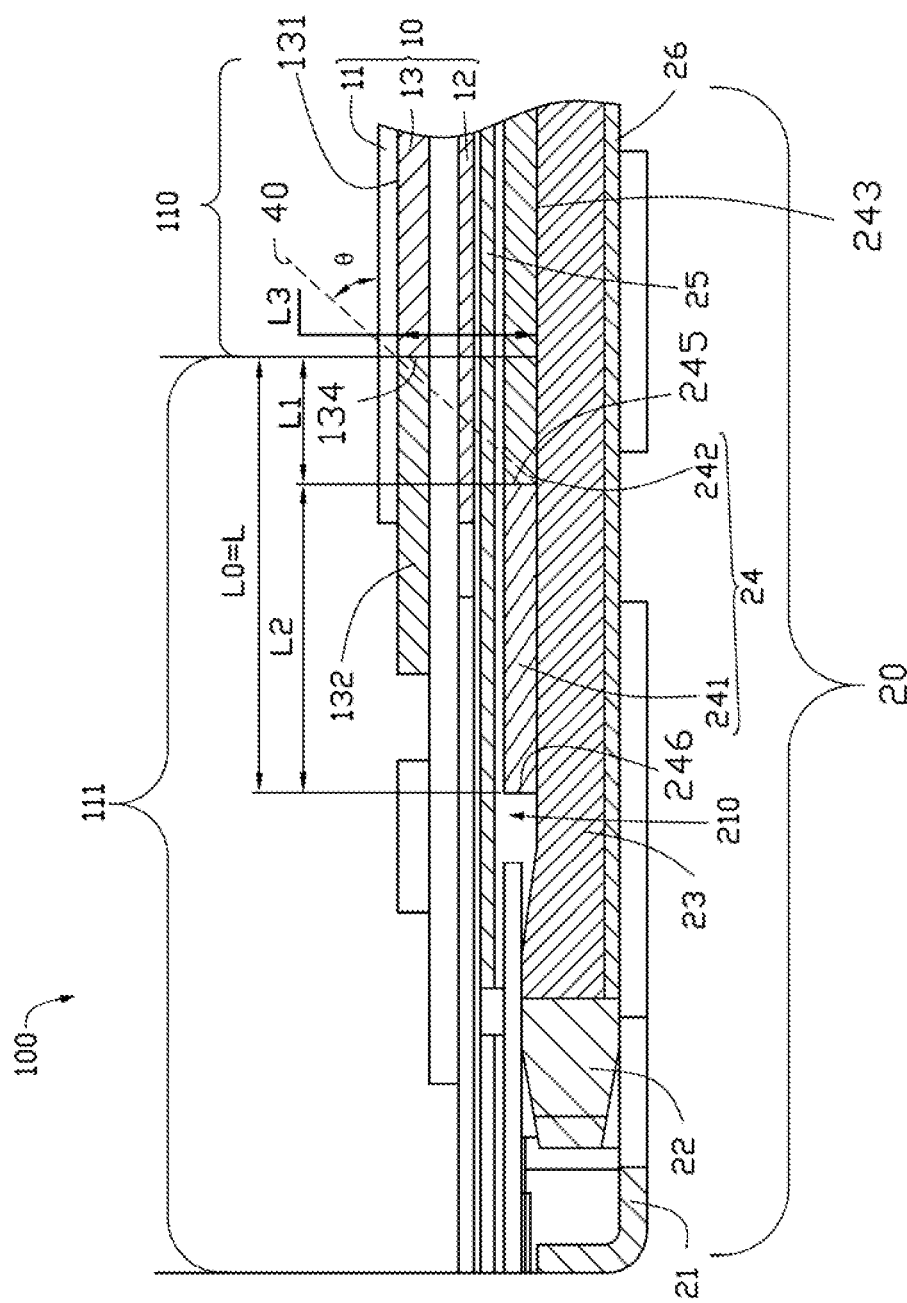
FIG. 2 is a cross-sectional view of an exemplary embodiment of the display apparatus of FIG. 1.

FIG. 1 and FIG. 2 illustrate an exemplary embodiment of a display apparatus 100. The display apparatus 100 can be for example a liquid crystal display (LCD). The display apparatus 100 includes a display panel 10 and a backlight module 20 below the display panel 10.

The display panel 10 has a substantially rectangular shape. The display panel 10 defines a main display region 110 and a non-display region 111. The non-display region 111 surrounds the main display region 110. The display panel 10 includes a first polarizer film 11, a second polarizer film 12 facing away from the first polarizer film 11, and a color filter layer 13 disposed between the first polarizer film 11 and the second polarizer film 12. The first polarizer film 11 is disposed on a surface of the color filter layer 13 away from the backlight module 20. The second polarizer film 12 is disposed on a surface of the color filter layer 13 adjacent to the backlight module 20. In at least one exemplary embodiment, the display panel 10 further includes a liquid crystal layer (not shown), a thin film transistor (TFT) array substrate (not shown), and a black matrix 132 for shielding light surrounding four edges of the color filter layer 13. In other embodiments, the color filter layer 13 includes green filter units, red filter units, and blue filter units, which are spaced from each other.

The backlight module 20 includes a frame 21, a light source 22, a light guide plate 23, a quantum dot enhancement layer 24, an optical film layer 25, and a reflector 26. Light directly emitted by the light source 22 and/or light reflected from the reflector 26 enters the display panel 10 by sequentially passing through the light guide plate 23, the quantum dot enhancement layer 24, and the optical film layer 25.

The frame 21 defines a receiving space 210. The light source 22, the light guide plate 23, the quantum dot enhancement layer 24, and the reflector 26 are received in the receiving space 210.

The light source 22 is located adjacent to or at a side surface of the light guide plate 23. The light source 22 emits light of a first wavelength having a first primary color. In at least one exemplary embodiment, the light source 22 is a light emitting diode and emits blue light.

The light guide plate 23 is received in the frame 21. A light emitting surface of the light guide plate 23 faces the display panel 10, and a light incident surface of the light guide plate 23 faces the light source 22. The light emitting surface of the light guide plate 23 may be perpendicular to the light incident surface of the light guide plate 23. The light guide plate 23 guides the light emitted by the light source 22 to the display panel 10. A bottom surface of the light guide plate 23 may form a light interference structure for ensuring uniformity of light.

The quantum dot enhancement layer 24 is located upon the surface of the light guide plate 23, and is disposed between the light guide plate 23 and the display panel 10. The quantum dot enhancement layer 24 contains quantum dots and is able to convert the light emitted by the light source 22 into light of predetermined wavelengths. The colors of the converted light having the predetermined wavelengths are different from the first primary color. In at least one exemplary embodiment, the quantum dot enhancement layer 24 includes a plurality of first quantum dots and a plurality of second quantum dots. A diameter of each of the first quantum dots is different from a diameter of each of the second quantum dots. The first quantum dot can convert the light of the first wavelength into light of a second wavelength having a second primary color, and the second quantum dot can convert the light of the first wavelength into light of a third wavelength having a third primary color. The light emitted by the light source 22, the light converted by the first quantum dots of the quantum dot enhancement layer 24, and the light converted by the second quantum dots of the quantum dot enhancement layer 24 are mixed to generate white light.

The quantum dot enhancement layer 24 further defines an invalidation portion 241 and a functional portion 242. The functional portion 242 is arranged in the main display region 110, and partially extends into the non-display region 111. The functional portion 242 can convert the first wavelength of the light emitted from the light guiding plate 23 into predetermined wavelengths. The invalidation portion 241 is unable to convert the first wavelength of the light into the light of predetermined wavelengths, the invalidation portion 241 being formed by a laser cutting process of the quantum dot enhancement layer 24. Quantum dots in the invalidation portion 241 may be damaged and lose the ability of converting wavelength of light. The functional portion 242 converts the light of the first predetermined into the light of predetermined wavelengths. The invalidation portion 241 is arranged in the non-display region 111, and surrounds the functional portion 242 in a manner similar to the non-display region 111 surrounding the main display region 110. A length of the invalidation portion 241 along a direction from the non-display region 111 to the display region 110 is in a range from 1.3 millimeters (mm) to 1.5 mm. A distance L0 from an edge of the invalidation portion 241 adjacent to the light source 22 to a boundary of the main display region 110 adjacent to the light source 22 is equal to or greater than a predetermined distance L. The predetermined distance L represents a minimum distance to prevent light that is leaked from the quantum dot enhancement layer 24 being emitted into the display region 110. The predetermined distance L is a sum of a first distance L1 and a second distance L2.

The first distance L1 is calculated based on a viewing angle θ used in inspection of a light leakage and a specified distance L3 between a bottom surface 243 of the quantum dot enhancement layer 24 and an upper surface 131 of the color filter layer 13. The first distance L1 is a minimum length between a side surface 245 of the invalidation portion 241 away from the light source 22 and a side surface 134 of the black matrix 132 away from the light source 22. FIG. 2 demonstrate an exemplary embodiment of the first distance L1. The viewing angle θ is a maximum angle for viewing images displayed by the display panel 10. That is, the viewing angle θ is an angle between an optical line 40 of the inspection and the display panel 10. The viewing angle θ is selected from a range between 30 degrees to 60 degrees. In at least one exemplary embodiment, the viewing angle θ is 45 degrees. The first distance L1 is calculated according to formula (1).

$$L1 = L3 \times \cot\theta \quad (1)$$

The second distance L2 is a length between a side surface 246 of the invalidation portion 241 adjacent to the light source 22 and the side surface 245 of the invalidation portion 241 adjacent to the functional portion 242.

Figure 3:
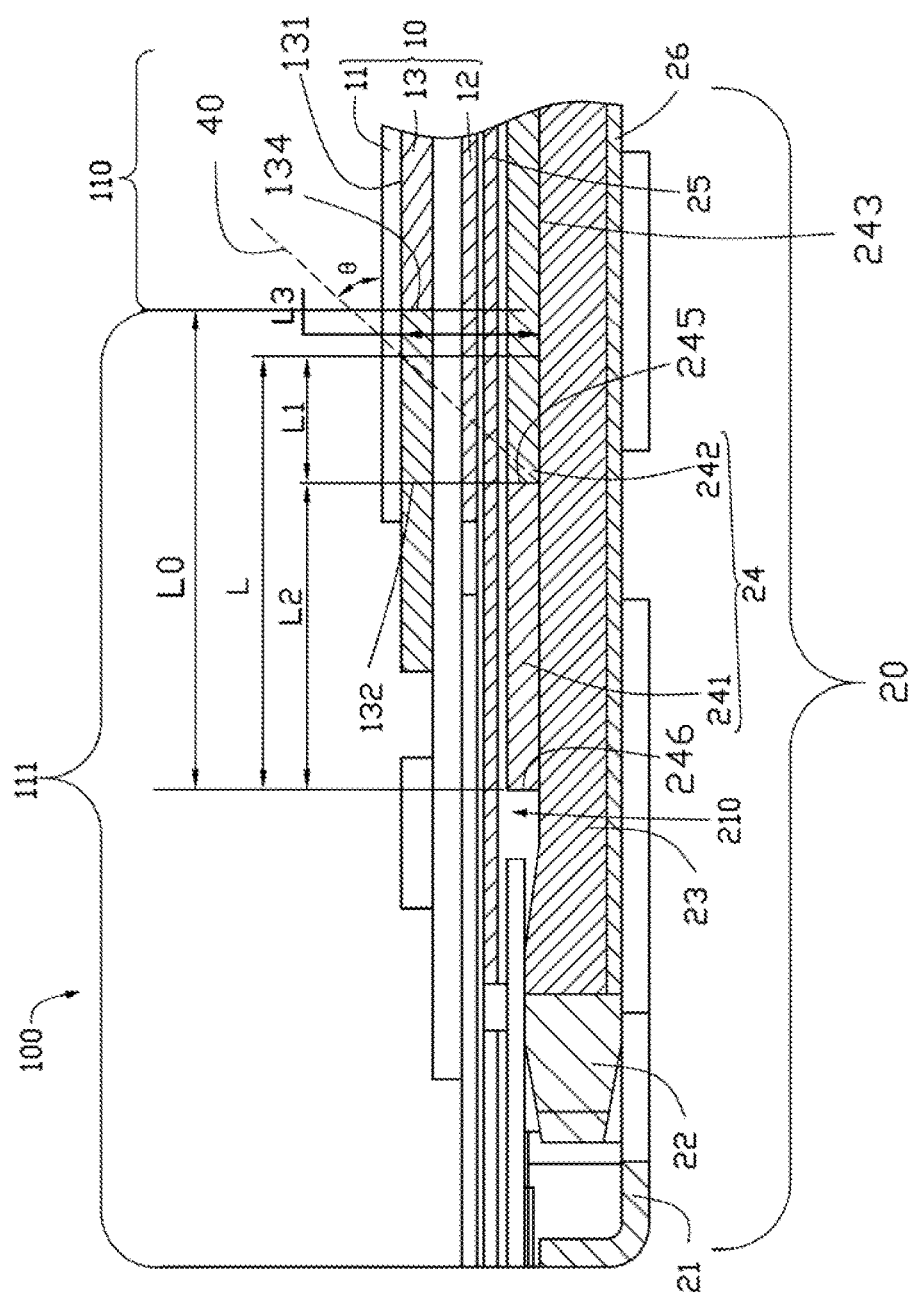
FIG. 3 a cross-sectional view of another exemplary embodiment of the display apparatus of FIG. 1.

FIG. 2 shows the distance L0 as equal to the specified distance L. As shown FIG. 3, in other embodiments, the distance L0 can be greater than the specified distance L.

The optical film layer 25 overlaps with the frame 21, and is supported by the frame 21. In at least one exemplary embodiment, the optical film layer 25 includes at least a prism film (not shown) and a diffuser film (not shown).

The reflector 26 is disposed on a bottom surface of the frame 21, and is disposed between the light guide plate 23 and the bottom surface of the frame 21. The reflector 26 can reflect light leaking from the bottom of the light guide plate 23 back into the light guide plate 23.

When the distance L0 is larger than the predetermined distance L, the light passing through the invalidation portion 241 with an angle larger or equal to the viewing angle θ is invisible to a viewer. Light passing through the invalidation portion 241 with an angle of less than the viewing angle θ is emitted into the main display region 110.

By virtue of the structure of the display apparatus 100, light passing through the light guide plate 23 and the quantum dot enhancement layer 24 with an angle larger or equal to the viewing angle, is not leaked from the quantum dot enhancement layer 24 to be emitted into the display panel 10, thus a display effect of display apparatus is improved.

Figure 4:
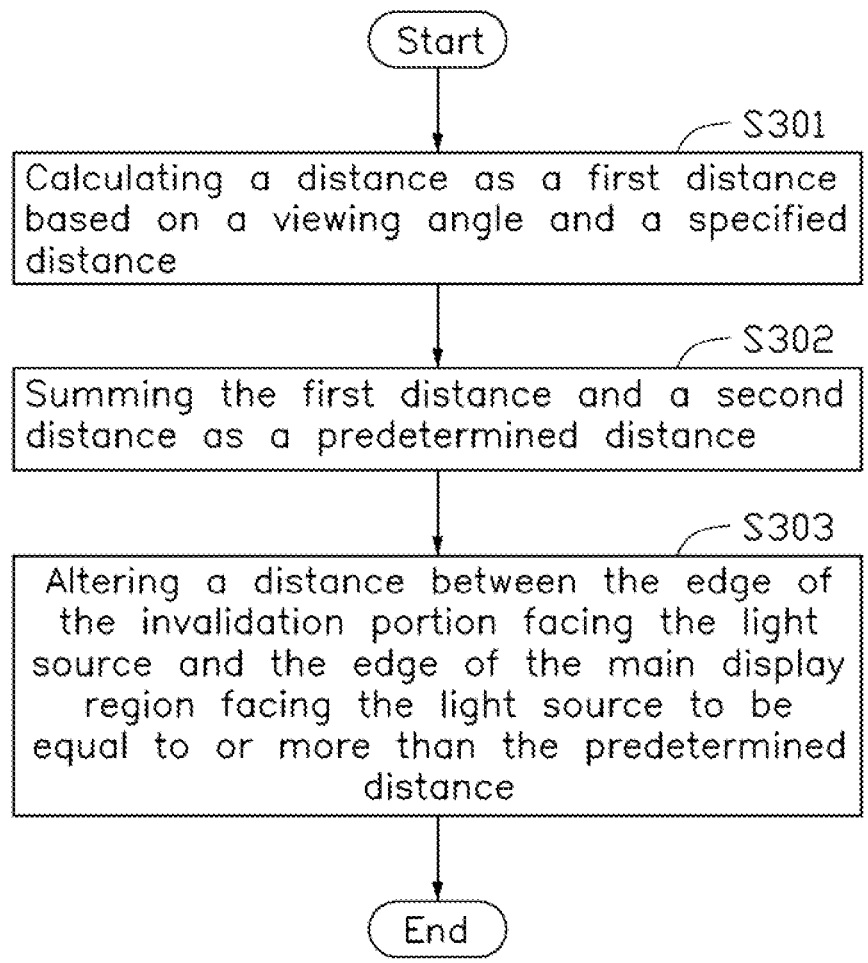
FIG. 4 is a flowchart of an exemplary embodiment of a method for altering the present display apparatus.

Referring to FIG. 4, a flowchart of a method for altering the present display apparatus 100 is presented in accordance with an example embodiment. The method for altering the present display apparatus 100 is provided by way of example, as there are a variety of ways to carry out the method. The method described below can be carried out using the configurations illustrated in FIGS. 1, 2 and 3, for example, and various elements of these figures are referenced in explaining the method. Each block shown in FIG. 4 represents one or more processes, methods or subroutines, carried out in the method. Additionally, the illustrated order of blocks is by example only and the order of the blocks can change according to the present disclosure. The method can begin at block 301.

At block 301, calculating a distance as a first distance L1 based on a viewing angle θ and a specified distance L3. The first distance L1 is a minimum distance between the side surface 245 of the invalidation portion 241 away from the light source 22 and the side surface 134 of the black matrix 132 away from the light source 22. The viewing angle θ is a maximum angle for viewing images displayed by the display panel 10. That is, the viewing angle θ is an angle between an optical line 40 of the inspection and the display panel 10. The viewing angle θ is selected from a range between 30 degrees to 60 degrees. In at least one exemplary embodiment, the viewing angle θ is 45 degrees. In at least one exemplary embodiment, the specified distance L3 is a distance between the upper surface 131 of the color filter layer 13 away from the quantum dot enhancement layer 24 and the bottom surface 243 of the quantum dot enhancement layer 24 adjacent to the light guide plate 23. The first distance L1 is calculated according to the formula (1).

At block 302, summing the first distance L1 and a second distance L2 as a predetermined distance L. The second distance L2 is a distance between a side surface 246 of the invalidation portion 241 adjacent to the light source 22 to the side surface 245 of the invalidation portion 241 adjacent to the display region 110.

At block 303, altering a distance L0 between the edge of the invalidation portion 241 adjacent to the light source 22 and the edge of the main display region 110 adjacent to the light source 22 to be equal to or more than the predetermined distance L.

The display apparatus 100 designed according the above method is capable of preventing a light leakage of the invalidation portion 241 of the quantum dot enhancement film 24 when inspected under the viewing angle θ used in inspection of a light leakage.

While various exemplary and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A display apparatus comprising:
   a display panel defining a main display region for displaying images and a non-display region surrounding the main display region; and
   a backlight module below the display panel and providing light to the display panel, the backlight module comprising:
      a light source emitting light of a first wavelength, the first wavelength having a first primary color;
      a light guide plate below the display panel and guiding the light to the display panel;
      a quantum dot enhancement layer disposed between the display panel and the light guide plate, and the quantum dot enhancement layer converting the light of the first wavelength having the first primary color into light of predetermined wavelengths; and
      a color filter layer between the quantum dot enhancement layer and the display panel;
   wherein the quantum dot enhancement layer defines a functional portion and an invalidation portion; the functional portion converts a wavelength of the light from the light guide plate into predetermined wavelengths; the invalidation portion is formed in the non-display region, and the invalidation portion is unable to convert the wavelength of the light from the light guide plate into predetermined wavelengths; and a distance between a side surface of the invalidation portion facing away from the light guide plate and a side surface of the main display region facing away from the light guide plate is larger than or equal to a predetermined distance; the predetermined distance is a sum of a first distance and a second distance; the first distance is equal to a specified distance multiplied by a cotangent of a viewing angle; the viewing angle is a maximum angle for viewing images displayed by the display panel; the viewing angle is selected from a range between 30 degrees and 60 degrees; the specified distance is a distance between the upper surface of the color filter layer away from the quantum dot enhancement layer and the bottom surface of the quantum dot enhancement layer adjacent to the light guide plate; the second distance is distance between a side surface of the invalidation portion adjacent to the light source and a side surface of the invalidation portion adjacent to the display region.

2. The display apparatus of claim 1, wherein the predetermined distance prevents the light transmitted from the invalidation portion from being entered into the display region when display apparatus is inspected under the viewing angle.

3. The display apparatus of claim 1, wherein the light passing through the invalidation portion with an angle less than the viewing angle is emitted into the main display region.

4. The display apparatus of claim 1, wherein the backlight module further comprises a reflector; the reflector is disposed on a bottom surface of the light guide plate; the reflector reflects light leaking from the bottom of the light guide plate back to the light guide plate.

5. The display apparatus of claim 1, wherein light source is at a side surface of the light guide plate.

6. The display apparatus of claim 1, wherein the backlight module further comprises an optical film layer; the optical film layer is disposed on the quantum dot enhancement layer.

7. A method for altering a display apparatus, the display apparatus comprising a display panel and a backlight module; the backlight module comprising a light source, a light guide plate, a quantum dot enhancement layer, and a color filter layer between the quantum dot enhancement layer and the display panel; the display panel defining a main display region for displaying images and a non-display region surrounding the main display region; the quantum dot enhancement layer defining a functional portion and an invalidation portion; wherein the functional portion converts a wavelength of the light from the light guide plate into predetermined wavelengths; wherein the invalidation portion is formed in the non-display region, and wherein the invalidation portion is unable to convert the wavelength of the light from the light guide plate into predetermined wavelengths; the method comprising:
   calculating a distance as a first distance calculated as a specified distance multiplied by a cotangent of a viewing angle; the viewing angle is a maximum angle for viewing images displayed by the display panel; the viewing angle is selected from a range between 30 degrees and 60 degrees; wherein the specified distance is a distance between the upper surface of the color filter layer away from the quantum dot enhancement layer and the bottom surface of the quantum dot enhancement layer adjacent to the light guide plate;
   summing the first distance and a second distance as a predetermined distance; the second distance is distance between a side surface of the invalidation portion adjacent to the light source to a side surface of the invalidation portion adjacent to the display region; and
   altering a distance between the side surface of the invalidation portion adjacent to the light source and the side surface of the main display region adjacent to the light source to be equal to or more than the predetermined distance.

8. The method of claim 7, wherein the first distance is calculated by the specified distance multiplied by a cotangent of the viewing angle.

* * * * *